June 5, 1934.  J. P. McARDLE ET AL  1,961,591

SALVAGING APPARATUS

Filed May 18, 1932  4 Sheets-Sheet 1

Inventors
James P. McArdle
and
Thorkild R. Knudsen
By
His Attorney

Patented June 5, 1934

1,961,591

UNITED STATES PATENT OFFICE 1,961,591

SALVAGING APPARATUS

James P. McArdle and Thorkild R. Knudsen,
New York, N. Y.

Application May 18, 1932, Serial No. 612,022

20 Claims. (Cl. 114—51)

This invention relates to salvaging apparatus and relates more particularly to means or apparatus for salvaging sunken vessels. A general object of the present invention is to provide a practical and effective apparatus for salvaging sunken vessels, etc.

Another object of the invention is to provide salvaging apparatus by means of which sunken vessels may be quickly raised or brought to shallow depths where they are easily accessible for raising.

Another object of the invention is to provide a salvaging apparatus that includes a novel and particularly effective means for grappling and suspending or carrying a sunken vessel, that may be operated without the aid of a diver.

Another object of the invention is to provide a salvaging apparatus that includes a lever mounted on a vessel and carrying at one end the grapple means mentioned above, and that has its other end or arm connected with a vessel having ballast tanks that may be alternately filled with and emptied of water to operate the lever.

Another object of the invention is to provide a salvaging apparatus of the character mentioned including an improved chain structure for carrying the grapple means.

Another object of the invention is to provide apparatus of the character mentioned that includes an improved ratchet mechanism for controlling the movement of the grappling chain or chains.

Another object of the invention is to provide a salvaging apparatus of the character mentioned in which the vessel or ship carrying the lever is stabilized and prevented from overturning or capsizing by a stabilizing beam connecting it with another ship.

Another object of the invention is to provide a salvaging apparatus of the character mentioned that may include one or more lever units and/or one or more floating vessel units each carrying lever units that may be disposed so as to have the grappling devices engage the sunken vessel at suitable points.

It is another object of the invention to provide a salvaging apparatus of the character mentioned that operates to raise or salvage a sunken vessel quickly and safely, and at slight cost.

A further object of the invention is to provide a salvaging apparatus particularly adapted for salvaging comparatively small vessels, in which all of the active and principal parts may be carried and transported by a single ship.

Other objects and features of the invention will be best and more fully understood from the following detailed description of typical forms and applications of the invention, throughout which description, reference is had to the accompanying drawings, in which:

The present invention may be embodied in structures, forms and combinations varying considerably in character, depending upon the class, size, etc., of the vessel or vessels to be salvaged, and upon the locations and depths of the vessels to be salvaged. Throughout the following detailed disclosure of the invention, we will describe several typical embodiments and applications, it being understood that the invention is not to be taken as limited or restricted to the specific forms or applications about to be described, but is to be taken as including any features or modifications that may fall within the scope of the claims.

In its broader aspects, the invention provides, generally, a lever pivoted on a main or master ship, a stabilizing beam or element connecting the master ship with a stabilizing ship, suspension means in the form of a chain or chains connected with one end of the lever, a suitable grappling device on the lower end of the suspension means, means for operating the lever, and a ratchet means for governing the movement of the suspension means or chains.

The various forms of the present invention involve one or more salvaging units including the various elements just set forth, and these elements or structures may be of different proportions, character and construction in the several different embodiments. We will first proceed with a description of the embodiment of the invention illustrated in Fig. 2 of the drawings, and more particularly one of the lever units included in the form illustrated in Fig. 2 and illustrated in detail in Figs. 4, 5, 7, 8, 9, 10, 11 and 12, and will then proceed with the description of the various other forms of the invention.

Figures 1, 2:
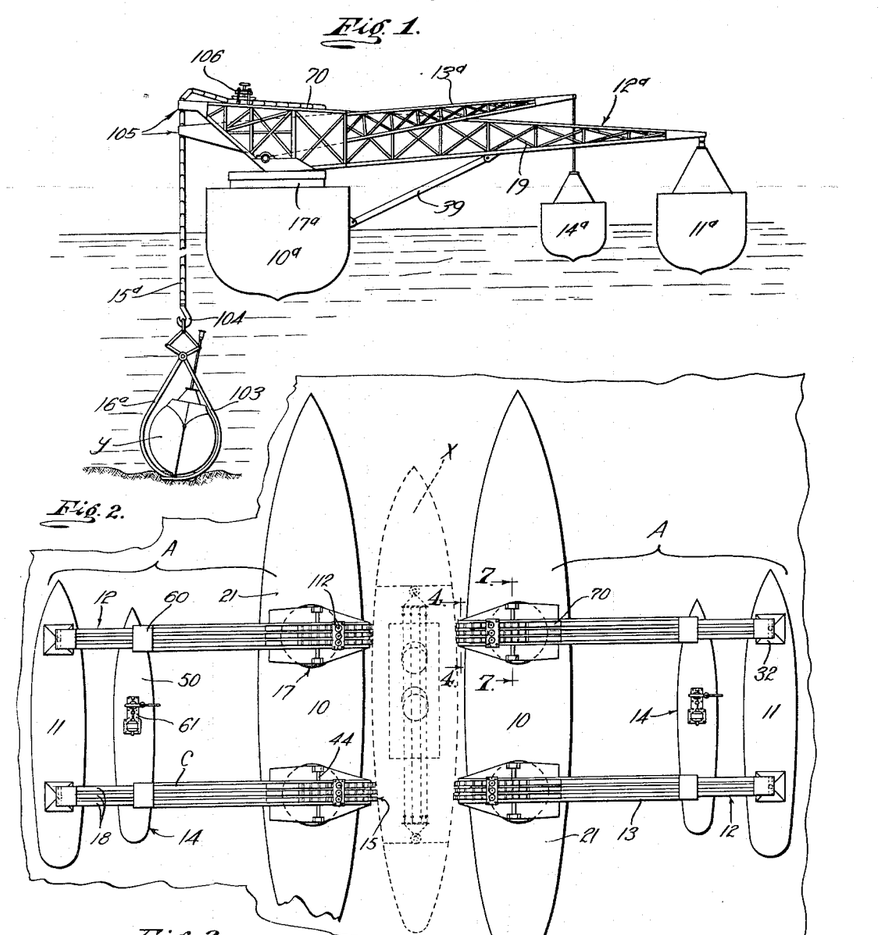
Fig. 1 is a more or less diagrammatic side view of one embodiment of the present invention, illustrating its grappling mechanism in engagement with a sunken submarine.
Fig. 2 is a diagrammatic plan view of another embodiment of the invention involving two floating ship groups each involving two lever units.

The form or embodiment of the present invention illustrated in a diagrammatic manner in Fig. 2 of the drawings, is intended and adapted to salvage large vessels, and includes one or more units A to be arranged over the sunken craft. Each unit A includes a master ship or main ship 10, a second ship or stabilizing ship 11, a stabilizer 12 extending between and connecting the vessels 10 and 11, a lever 13 mounted on the master ship 10 through the stabilizer 12, means 14 for operating the lever 13, suspension means in the form of chains 15 operated by the lever 13, means 16 governing the movement of the chains 15, and grapple means 160 carried by the chains 15.

The master ship 10 and the stabilizing ship 11 are related in tonnage etc., to one another, and to the sunken vessel, to be effective and reliable in properly carrying the various mechanisms and structures, and in supporting their portions of the weight of the sunken vessel X when it is being raised or salvaged. In Fig. 2 of the drawings, the ships 10 and 11 are illustrated diagrammatically, it being understood that they may be of any suitable type and construction. The master 10 is preferably brought to a position as nearly parallel to the sunken ship X as possible, and a short distance to one side of the sunken ship. In the particular case illustrated, there is a unit A including the master ship 10 and the stabilizing ship 11 located at each side of the sunken vessel X. It is to be understood that there may be as many of the salvaging units A provided to raise any given vessel as may be deemed advisable or practical, and that the several units may be disposed in any suitable manner. In the drawings, the master ships 10 of the two units A are shown as being somewhat larger than the sunken vessel X, while the stabilizing ships 11 are smaller than the master ships.

The stabilizer 12 of each lever unit or structure, connects the master ship 10 with the stabilizing ship 11. The stabilizer 12, together with the ship 11 operates to prevent undesirable listing and possible capsizing of the master ship 10 when the lever 13 is carrying the weight or a portion of the weight of the sunken vessel. There is one stabilizer 12 embodied in each lever unit. In the particular combination and construction illustrated in Fig. 2 of the drawings, there are two lever units or structures included in each of the salvaging units A, and accordingly the vessels 10 and 11 are connected by two stabilizers.

The stabilizers 12 are mounted on the master ship 10 at longitudinally spaced points to suitably distribute the load or weight on the master ship. It is preferred to mount each stabilizer 12 on the master ship 10 through a mounting 17 adapted to normally allow limited universal movement of the stabilizer 12 relative to the master ship 10, and capable of permitting extensive turning or rotation of the stabilizer relative to the ship to permit the stabilizer to be shifted from an inoperative position to a position where it is abeam of the master ship or projects laterally, as illustrated in the drawings. Each stabilizer 12 includes a plurality of parallel substantially horizontal beams 18, normaly disposed transverse of or abeam the master ship 10.

The several stabilizing beams 18 are equally spaced apart for the purpose to be hereinafter described. The stabilizer 12 projects outwardly from the master ship 10 to a point above the stabilizing ship 11, and projects a short distance outwardly in the opposite direction to over hang or project beyond the opposite side of the master ship. The stabilizers 12 may be strengthened and reinforced by a suitable fabricated structure 19.

Figures 4, 5, 6, 16, 17:
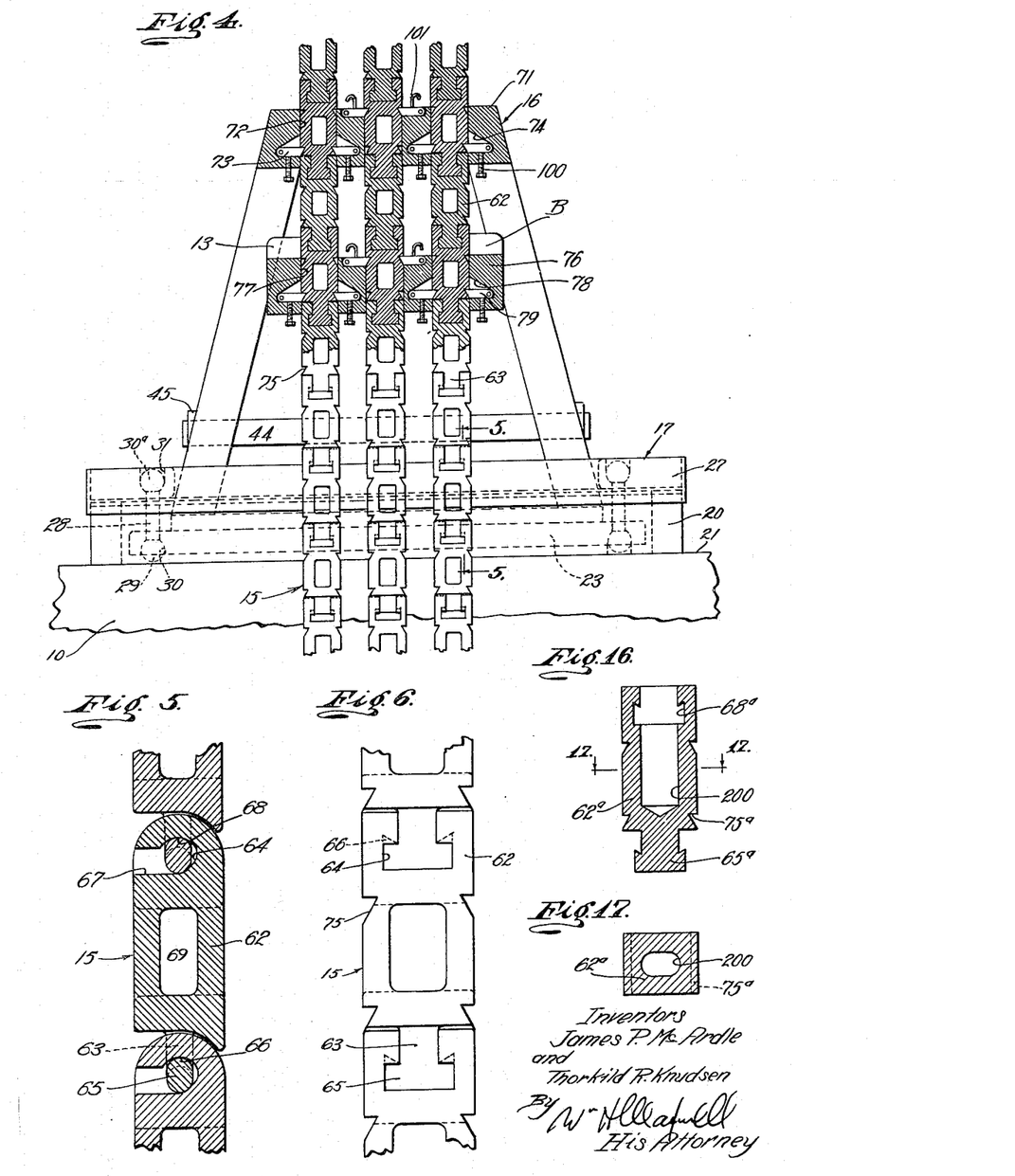
Fig. 4 is an enlarged vertical detailed sectional view of the ratchet suspension means showing the beam and stabilizer mounting in elevation, being a view taken substantially as indicated by line 4—4 on Fig. 2.
Fig. 5 is an enlarged vertical detailed sectional view of a portion of one of the chain structures, being a view taken as indicated by line 5—5 on Fig. 4.
Fig. 6 is a front elevation of a portion of another form of chain.
Fig. 16 is a longitudinal sectional view of another form of chain.
Fig. 17, is a transverse sectional view taken on line 17—17 on Fig. 16.

The mounting 17 for carrying the stabilizer 12 may be varied somewhat, depending upon the size and weight of the stabilizer and lever. The stabilizer mounting 17 includes an annular base or track 20 attached to the deck 21 of the master ship 10. It is to be understood that the deck 21 of the master ship may be suitably strengthened and constructed to effectively carry the weight to which it is to be subjected. The beams 18 of the stabilizer carry a plurality of superimposed beams or blocks 22 which extend downwardly into the annular base 20. The blocks 22 support the beams 18 on a disc shaped base plate 23. The fabricated structures 19 at the opposite sides of the stabilizer 12 also extend downwardly to be supported on the base plate 23. The base plate 23 is disposed within the track or base 20 and has its periphery spaced from the interior of the track so that it may have limited horizontal movement. An annular carrier 24 is arranged on the upper end of the track or base 20. The cooperating faces of the track and carrier may be hard faced or provided with hardened plates 25. The carrier 24 is rotatable on the track 20, but is normally held against rotation by means of removable pins 26. A flange 27 operates to guide the carrier 24 on the track 20 and to prevent displacement of the carrier.

The base plate 23 carrying the stabilizer 12 in the manner described above, is suspended from the carrier 24 by means of links 28. The links 28 are provided on their lower ends with spherical enlargements 29, fitting correspondingly shaped sockets 30 in the lower side of the base plate 23. The sockets 30 are circumferentially spaced in the base plate 24, and the links 28 extend upward to pass through openings in the base plate and carrier 24. Spherical enlargements 30ª are provided on the upper ends of the links 28, and seat in suitably shaped sockets 31 in the carrier 24. It will be obvious how the links 28 suspend the base plate 23 from the carrier 24, so that the stabilizer 12 may have limited movement relative to the master ship 10, to compensate for any variations in movement between the ships 10 and 11, and any other relative motions that may develop. When the stabilizer 12 is to be turned from an inoperative position, for example, a position where it is longitudinal of the master ship 10, to its operative position projecting from the side of the master ship, the pins 26 may be removed, allowing the carrier 24 to be turned on the track 20. The pins 26 may be replaced to retain the carrier and the stabilizer 12 in the normal or operative positions.

Suitable means is provided for connecting the outer end of the stabilizer 12 with the stabilizing ship 11. The connecting means is preferably constructed to allow limited movement between the outboard ship 11 and the stabilizer 12. In the particular connecting means illustrated in detail in Fig. 9 of the drawings, a fabricated tower 32 is provided on the stabilizing ship 11. A sectional socket member 33 is mounted on the upper end of the tower 32, while a downwardly projecting cylinder 34 is attached to the outer end of the stabilizer. A stem 35 extends into the cylinder 34 and is provided at its lower end with a ball 36 operating in the socket member 33. A head or piston 37 is provided on the stem 35 to operate in the cylinder 34. Heavy coiled springs 38 are arranged under compression between the opposite ends of the cylinder 34 and the piston 37 to yieldingly resist movement between the stabilizer and the ship 11, and to limit relative movement between the stabilizer and the ship. The ball 36 cooperates with the socket member 33 to permit limited relative tilting between the ship 11 and the stabilizer 12.

A suitable brace or braces may be provided between the stabilizer 12 and the side of the master ship 10 to prevent listing and swinging of the master ship. Figs. 1 and 2 of the drawings illustrate braces 39 connecting the under side of a stabilizer with a master ship. The connections between the braces 39 and the ship and stabilizer may be pivotal connections to allow limited universal movement. It will be obvious how such braces or links may be connected between the stabilizer 12 and the master ship 10. As each salvaging unit A involves two stabilizers 12 connected to the ships 10 and 11 at spaced points, substantial swinging or turning movement between the vessels is prevented. The stabilizers 12, in being connected with the master ship 10 at longitudinally spaced points, effectively prevent listing and rolling of the master ship.

Figure 7:
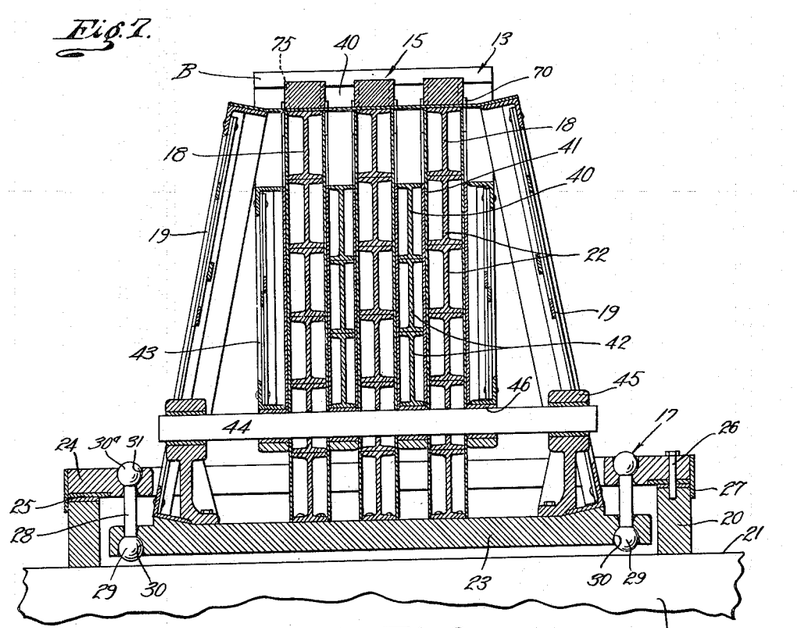
Fig. 7 is an enlarged vertical detailed sectional view of the lever and stabilizer structure, being a view taken substantially as indicated by line 7—7 on Fig. 2.

The lever 13 is the active or main moving element of each lever unit, and operates the chains 15 to raise the sunken vessel. In the particular form of the invention being described, the lever 13 is pivotally mounted on the master ship 10 through the stabilizer 12. Each lever 13 includes a plurality of spaced parallel beams 40 adapted to operate vertically between the spaced beams 18 of the stabilizer. Plates 41 may be provided on the adjoining sides of the beams 18 and 40 to guide the lever beams. The pivotal mounting of the lever 13 is preferably located between the axis of the mounting 17, and the outer end of the shortest arm of the stabilizer. A superimposed series of beams or blocks 42 and fabricated side structures 43 extend downwardly from the lever beams 40 to points adjacent the carrier 24. A pivot shaft 44 is carried by the stabilizer 12 through suitably spaced bearings 45. Bearings 46 on the lever structure pass the shaft 44 to pivotally mount the lever on the stabilizer 12 at a point adjacent the mounting 17. The short arm B of the lever 13 is of substantially the same length as the short arm of the stabilizer 12, while the long arm C of the lever projects a considerable distance laterally from the master ship 10 toward the stabilizing ship 11. As the beams 40 of the lever operate between the stabilizing beams 18, the lever 13 is free to pivot. The upper part of the short arm of the stabilizer and the under side of the outermost part of the lever arm C may be closed in or made continuous to provide for cooperation between the beam and lever to limit the pivotal movement of the lever. The beams 40 of the lever may be connected by the fabricated structures 43, which operate to give the lever great strength.

Figure 8:
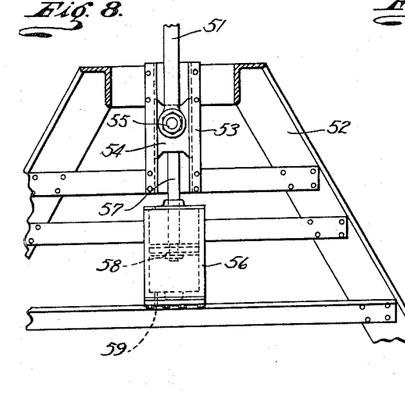
Fig. 8 is an enlarged fragmentary vertical sectional view of the connection between the lower end of the lever rod and the jack or pumping ship.
Figure 9:
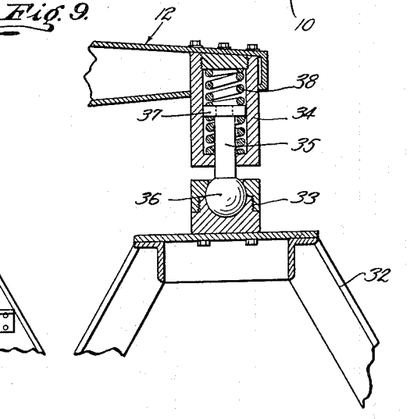
Fig. 9 is an enlarged detailed vertical sectional view of the connection between the stabilizer and the stabilizing ship.

The means 14 for operating the lever 13 is in the nature of a hydraulic means involving a lifting ship or jack ship 50 connected with the lever arm C of the lever. The jack ship 50 is disposed between the ships 10 and 11 and below the outer end of the long lever arm C. Where each salvaging unit A includes two lever structures as illustrated in Fig. 2 of the drawings, a single jack ship 50 may be connected to the long arm C of the two levers 13. A rod 51 may connect the outer end of each lever arm C with the jack ship 50. In the specific embodiment of the invention being described, a suitable tower structure 52 is provided on the jack ship 50 below the outer end of each lever arm C. Vertical slides 53 are mounted in each tower 52 and carry a block 54 for vertical movement. A pivotal connection 55 is provided between the lower end of the rod 51 and the block 54 which allows tilting of the rod 51 relative to the slidable block. A cylinder 56 is mounted in the tower 52 below the slides 53. A rod 57 is connected to the sliding block 54 by the connection 55 and extends downwardly into the cylinder 56. A piston 58 is provided on the rod 57 and operates within the cylinder 56. Restricted openings 59 are provided in the opposite ends of the cylinder 56 so that a dash pot connection is obtained to yieldingly resist vertical movement of the rod 51. A connection 60 is provided on the upper end of the rod 51 and the outer end of the lever arm C. The connection 60 may allow limited universal movement between the lever and rod 51 and may be similar generally to the connection between the stabilizer 12 and the tower 32 described above.

The water is alternately passed into and pumped from the jack ship 50 to provide for operation or pivoting of the levers 13. Special ballast chambers or tanks may be provided in the jack ship 50 as found desirable or practical, and pumping means is provided on the jack ship to pump the water from these chambers. In the diagrammatic view of the invention, pumps 61 are shown on the jack ships 50 for pumping the water from them. It will be apparent how the levers 13 are operated by alternately passing water into and out of the jack ship 50. The speed of movement of the levers, of course, depends upon the speed of the inflow and discharge of water from the jack ship. The towers 52 at the lower ends of the connection rods 51 are preferably provided on the jack ship 50 at spaced points, and the jack ship 50, in being rigid, operates the levers of the two lever units in synchronism. As the lever arms C are of much greater length than the lever arms B, a substantial leverage is obtained for operating the chains 15 depending from the ends of the lever arms B.

The suspension means or chains 15 are suspended from the ends of the lever arms B and carry the grapple means 160 for engaging the sunken vessel X. There may be any suitable number of chains 15 extending downwardly from each lever arm B. In the particular case illustrated in the drawings, there are three like chains 15 provided on each lever. It is a feature of the present invention that the chains 15 are constructed so that they may be disjointed or disconnected to facilitate their handling, storage and transportation.

The links 62 of the chains 15 are all identical and are in the nature of integral members or parts. The links 62 are preferably elongate, and may be of rectangular cross section. Each link 62 includes a tongue 63 projecting from one end, and has a socket 64 in its opposite ends. The tongues 63 of the several links 62 are adapted to extend into and cooperate with the sockets 64 of the adjoining links. Transverse pin portions or pins 65 are provided on the lower end of each tongue. The pins 65 are substantially round in cross section, but have eccentric lugs 66 on their upper ends. The socket 64 extends into the upper end of the link and has a channel or passage 67 extending to one side of the link. The channel 67 is shaped and proportioned to freely pass the tongue 63 and its pins 65 of the next adjoining link. The pins 65 are related to the passages 67 so that the links must be inclined relative to one another to pass the lug portions 66. Enlargements 68 are provided in the upper wall of the sockets at their junctures with the passages 67. The enlargements 68 are adapted to receive the eccentric lugs 66 when the two links 62 are straightened out or brought into longitudinal alignment. In this manner, the cooperation between the eccentric lugs 66 and the enlargements 68 positively prevent disconnection between the links when in all positions, excepting one tilted position in which the pin 65 may pass through the passages 67.

Figs. 16 and 17 illustrate a modified form of chain. In this form the links 62ª are each provided with a single longitudinal opening 200. The openings 200 are provided to lighten the chain and extend downwardly through the links from their upper ends. The openings 200 intersect the sockets 64ª but terminate at points spaced from the lower ends of the links. In other respects, the type of chain illustrated in Figs. 16 and 17 may be identical with the chain 15.

As the chain links 62 are comparatively large and heavy members, they are preferably hollow, cored out, or provided with transverse openings 69 as illustrated in the drawings. The upper ends of the links 62 may be rounded as shown, while the lower ends of the links may be substantially flat. It is believed that it will be apparent how the chains 15 may be easily assembled when they are to be put into use, and how the several links 62 constituting the chains may be easily stored or stowed away when the chains are disconnected. Channels 70 may be provided on the upper side of the stabilizer 12 to hold the assembled portions of the chains 15 not yet in use, and to hold some of the links prior to their assembling.

The means 16 for controlling movement of the chains 15 operates to hold the chains against downward movement when the short arm B of the lever is on its downward stroke, and connects the chains with the lever arm B so as to move therewith when it is on its upward stroke. The means 16 is in the nature of a ratchet means and includes a block 71 carried on the outer end of the short arm of the stabilizer 12. Spaced vertical openings or slots 72 are provided in the block 71 to pass the several chains 15. The slots 72 are preferably equally spaced and are proportioned to freely pass the chains 15. A plurality of dogs 73 are pivoted in sockets 74 in the walls of each slot 72. The dogs 73 are pivoted on horizontal axes, and are operable between positions free or clear of the slots 72 and positions where they project into the slots. The outer projecting ends of the dogs 73 may be inclined downwardly and outwardly. The dogs 73 are provided to cooperate with notches 75 provided in the ends of the chain links 62. The notches 75 are shaped and proportioned to effectively receive the projecting ends of the dogs 73. When the dogs 73 cooperate with the notches 75, they suspend the chains 15 and the parts connected therewith from the block 71 on the stabilizer.

The ratchet means 16 includes a block 76 mounted on the short arm B of the lever 13. The block 76 may be similar to the block 71, and is provided with a plurality of spaced vertical slots 77 for passing the chains 15. The slots 77 are in vertical alignment with the slots 72 and are provided on their opposite side walls with sockets 78. Pivoted dogs 79 are mounted in the sockets 78 and are operable between positions where they are free of the slots 77 and positions where they project into the slots to cooperate with the notches 75 in the chains 15. During operation of the lever 13, the dogs 73 in the stationary block 71 cooperate with the notches 75 during the downward stroke of the lever arm B, to suspend the chains 15. It will be apparent how the dogs 79 on the lever block 76 move upwardly in the sockets 78 and freely pass the chains 15 during downward movement of the lever arm B. When the lever arm B moves upwardly, the dogs 79 automatically fall into the notches 75 and cooperate with the notches to cause the chains 15 to be moved upwardly together with the lever arm B. During upward movement of the chains 15, the upper dogs 73 move outwardly in the sockets 74 and permit the chains to freely pass through the slots 72.

Figure 10:
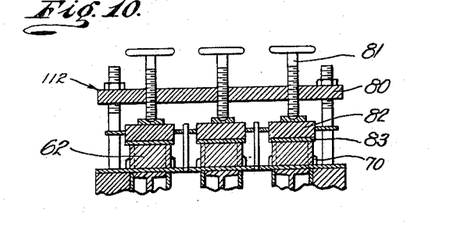
Fig. 10 is an enlarged detailed vertical sectional view of the brake means for holding the chains against movement when the ratchet means is inoperative.

The invention may include a suitable brake means or holding means 112 for holding the chains 15 against downward movement when they are being initially suspended from the lever and stabilizer. It will be apparent that the brake means for holding the chains 15 may be varied somewhat without departing from the broader aspects of the invention. In the particular case illustrated in the drawings, the brake means includes a suitable yoke or frame 80 mounted on the upper side of the stabilizer 12. The frame 80 carries a plurality of screws 81 operable by hand wheels or other means, and provided to operate and position blocks or brake shoes 82. The brake shoes 82 may be provided with suitable friction lining 83 for cooperating with the chain links 62 carried in the channels 70. It will be obvious how the screws 81 may be controlled to positively hold the chains 15 against downward movement, and to lessen the downward movement of the chains when they are initially lowered into the water.

The invention may include means for moving the ratchet dogs 73 and 79 to inoperative positions so that the chains 15 may be freely lowered through the blocks 71 and 76 under control of the brake described above. Any desirable or suitable means may be provided for shifting the ratchet dogs to their up or out positions where they are clear of the slots 72 and 77. In the particular case illustrated in the drawings, screws 100 are provided to shift the lowermost dogs to their out positions, while hooks or eye members 101 are shown on the uppermost ratchet dogs whereby they may be manually moved to the inoperative positions. During the initial lowering of the chains 15 through the ratchet means 16, the rachet dogs 73 and 79 are in their up or inoperative positions so that they do not interfere with the free passage of the chains through the ratchet blocks.

Figure 11:
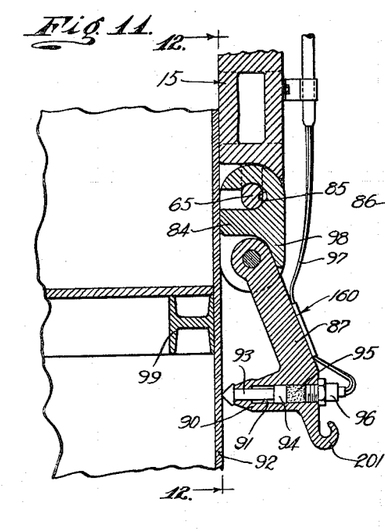
Fig. 11 is an enlarged vertical detailed sectional view of the grappling means and a portion of the sunken vessel.

The grapple means 160 is carried on the lower end of the several chains 15 of each lever unit and is provided to connect the chains with the sunken vessel X so that the vessel may be raised or moved. The grapple means 16 may be varied considerably in proportions, construction and operation to adapt it for engaging or connecting with sunken vessels of various types and sizes. The present invention provides an improved and particularly effective grapple means that may be controlled and operated without the aid of a diver. The grapple means 160 includes a block or header 84 connected to the lower ends of the spaced chains 15. Sockets 85 and channels 86 are provided in the upper end portion of the blocks 84 to receive the tongues and pins of the lowermost chain links 62. The block 84 is thus connected with and carried by the chains 15.

Figure 12:
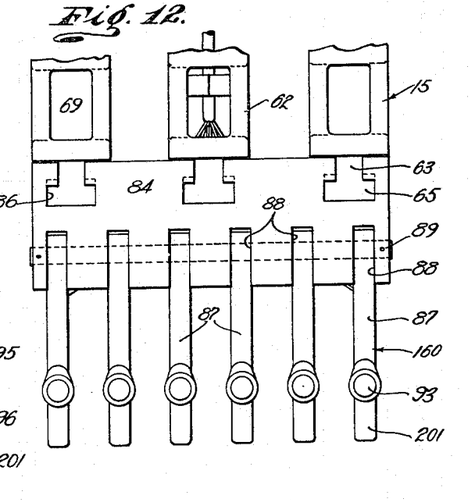
Fig. 12 is a front elevation of the grappling mechanism, being a view taken as indicated by line 12—12 on Fig. 11.

A plurality of pivoted members or hooks 87 hang downwardly from or depend from the block 84. The hooks 87 may be suitably spaced apart and have their upper ends extending into slots 88 in the lower end of the block. A pin or shaft 89 extends through openings in the block 84 and hook members 88, to pivotally connect the hook members with the block. The hook members 88 are each provided at their lower end with laterally projecting hook portions 90, and are each provided with a longitudinal opening 91. The hook portions 90 are adapted to face or project toward the side 92 of the sunken vessel X and the openings 91 carry piercing members 93. The piercing members 93 project from the forward ends of the openings 91 and their ends may be pointed and barbed as illustrated in Fig. 11 of the drawings. An enlargement or head 94 is provided on each piercing member 93 to cooperate with a reduced part of the opening 91 to limit the outward movement of the piercing member. A charge 95 of explosive material is provided in each opening 91, and may be ignited by an electrical control cap or ignition device 96. Electrical conductors 97 are connected with the caps 96 and extend to the surface so that the ignition of the charges 95 may be readily controlled. Hook projections 201 may be provided on the lower rear ends of the members 87 whereby suitable weights may be suspended from the members 87 if desired. The members 87 are shaped and mounted so that the piercers 93 may engage the hull of the sunken vessel and are comparatively heavy so as to be very stable and steady; however, in certain instances, it may be desirable to suspend weights from the projections 201 to lend greater weight and stability to the members 87.

The hooks 87 are shaped and proportioned so that the projecting ends of the piercing members 93 engage against the side or hull 92 of the sunken vessel when the chains 15 are lowered alongside the sunken craft. Lugs 98 may be provided on the block 84 to limit the outward pivoting of the hooks 87 so that the reaction of the ignited charges 95 cannot materially disturb the position of the hooks 87. The chains 15 may be lowered to positions where the piercing members 93 will pass through a suitable portion of the structure of the sunken vessel X. An operator or operators may be lowered into the water in a drum or cylinder provided with openings closed with transparent material and having lights whereby the position of the hooks 86 may be determined. The operators in the submerged cylinder may by means of suitable signals or telephone conversation, direct the movement of the chains 15 so that the hooks 87 may be brought to positions where the piercing members 93 will enter the hull of the sunken vessel to obtain an effective hold. It may be desirable to have the piercing members 93 enter the hull 92 of the sunken vessel immediately below a deck beam structure 99. Upon ignition of the charges 95, the piercing members 93 are blown or projected into the hull 92 of the sunken vessel and their barbed ends obtain effective holds or grips. As the hooks 87 tend to hang toward the hull 92 there is no tendency for the hooks or gripping members 93 to loosen their holds from the sunken craft when they are moved upward and take the weight of the sunken vessel.

It is believed that the operation of the embodiment of the invention described above will be readily apparent from the foregoing detailed description. The ships 10, 11 and 50 of the salvaging units A may be positioned with respect to the sunken vessel X so that the chains 15, when lowered from the stabilizers 12, will pass down alongside of the sunken ship. The several chains 15 may be readily assembled in the manner described above, and the lowering of the chains 15 may be easily controlled by means of the brake shoes 82. The proper positioning of the grapple hooks 87 with respect to the sunken craft X may be easily carried out by means of operators in a cable-suspended cylinder. The operators in the cylinder may readily direct the movement of the chains 15, and the ultimate positioning of the hooks 87, by signalling the operators at the surface. When the hooks 87 have been positioned as desired, the charges 95 may be set off by the passage of current through the conductors 97. When the charges 97 are set off, the piercing members 93 are driven through the hull 92 of the sunken craft X so that they obtain a firm hold on the structure of the sunken ship. When the several hook members 87 of all of the lever units have been connected in this manner, water ballast that may be left in the master ships 10 until this time, may be pumped out, thus causing an initial raising of the master ships 10 and initial upward movement of the chains 15. This further insures an effective hold or grip on the sunken vessel X, and may raise the sunken vessel a certain extent. The several levers 13 may then be actuated by alternately passing water into and pumping water from the jack ships 50. Continued operation of the levers 13 in this manner may raise the sunken vessel X to a position where it is accessible to divers, or the salvaging units A may be advanced toward land or shallower depths during actuation of the levers 12 so that the sunken ship is moved to a place where it is more easily accessible. During the raising of the chains 15, their several links 62 may be disconnected after their passage through the ratchet block 71 and may be readily stowed away. The apparatus may be operated in various manners depending upon the particular conditions prevailing, the particular location and position of the sunken craft, etc., it being understood that the mode of operation described above is merely typical.

The embodiment of the invention illustrated in Fig. 1 of the drawings is particularly adapted to salvaging comparatively small craft such as submarines, and the like. This embodiment of the invention includes a master ship $10^a$, a stabilizing ship $11^a$, a stabilizer $12^a$ connected to two ships, a pivoted lever $13^a$, a jack ship $14^a$ for operating the lever, chains $15^a$ operated by the lever $13^a$ and various other parts and structures about to be described.

The stabilizer $12^a$ may be mounted on the master ship $10^a$ through a mounting $17^a$ similar to the mounting 17 described above, while the lever $13^a$ may be pivoted on the master ship $10^a$ through the stabilizer $12^a$. There may be one or more of these lever units provided on the master ship $10^a$ and each lever unit may operate any suitable number of chains $15^a$. The chains $15^a$ may be of the same construction as the chains 15 any carry a grapple means $16^a$. It will be obvious that any suitable form of grapple means may be carried and operated by the chains $15^a$. In the particular case illustrated, the grapple means $16^a$ includes tong-like members 103 connected together and carried by a hook 104 on the lower end of the chain combination $15^a$. The ratchet means 105 on the short arms of the lever $13^a$ and the stabilizer $12^a$ may be identical with or similar to the ratchet means 16 described above, and may include or may be supplemented by a suitable brake structure 106.

The operation of the form of the invention disclosed in Fig. 1 of the drawings, is similar generally, to the operation of the previously described embodiment. The chains $15^a$ may be assembled and lowered through the ratchet means 105 under control of the brake 106. The grapple means $16^a$ may be actuated or set to engage about the sunken vessel Y with or without the aid of divers or operators lowered in a cylinder suspended from a cable. When the grapple means $16^a$ has secured its hold, water ballast may be pumped from the master ship $10^a$ and cause initial upward movement of the chains $15^a$. The lever $13^a$ may then be actuated by passing water in and pumping water from the jack ship $14^a$. It will be apparent how this form of apparatus is operable to effectively raise a sunken craft in a very short time.

Figure 3:
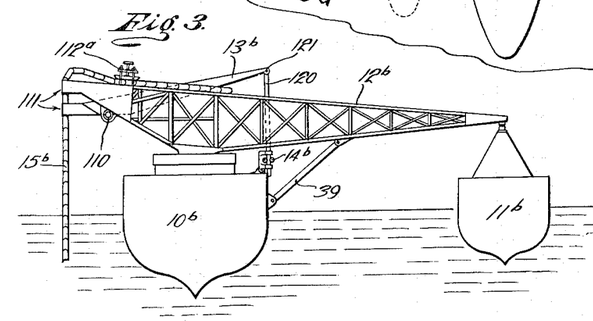
Fig. 3 is a side elevation of another embodiment of the invention in which the lever is operated from the master ship by mechanical means.

Fig. 3 of the drawings illustrates an embodiment of the invention wherein a lever $13^b$ is actuated by mechanical means $14^b$ provided on the master ship $10^b$. The master ship $10^b$ may be stabilized by means of a stabilizer $12^b$ connecting the master ship with a stabilizing ship $11^b$. The manner of mounting the stabilizer $12^b$ on the master ship and stabilizing ship may be similar to the corresponding means described above. In this embodiment of the invention, the lever $13^b$ may be comparatively short, and is pivoted to the short arm of the stabilizer $12^b$ as at 110. The lever $13^b$ is operable to move or actuate a chain combination $15^b$ whose movement is controlled by a ratchet mechanism 111 on the short arms of the stabilizer and lever. The initial lowering of the chain 15 may be controlled by a brake mechanism $112^a$ on the upper side of the stabilizer $12^b$. There may be one or more of these stabilizer and lever units mounted on the master ship $10^b$ and they may be proportioned and designed to handle various classes and sizes of sunken vessels. The mounting of the stabilizer $12^b$ may be such that the stabilizer and lever may be swung to a position fore and aft of the master ship when the apparatus is not in use.

Figure 13:
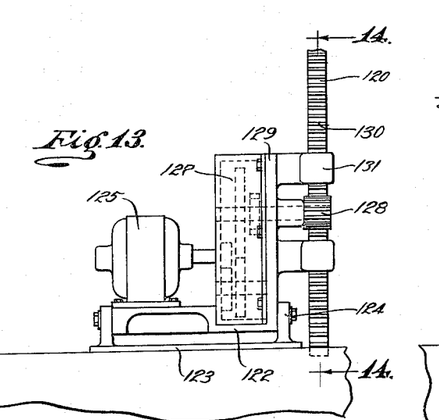
Fig. 13 is a side elevation of the means for operating the lever in the form of the invention disclosed in Fig. 3.
Figure 14:
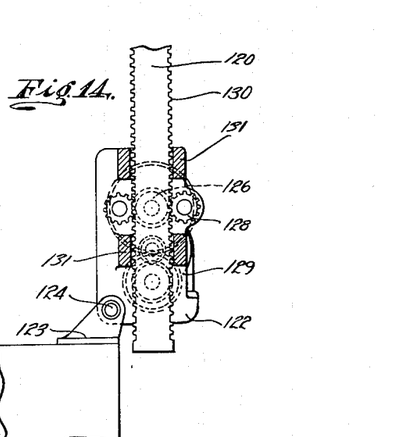
Fig. 14 is an end view of the mechanism illustrated in Fig. 13.

The mechanical means $14^b$ for operating the lever $13^b$ is illustrated in Figs. 13 and 14 of the drawings. The means $14^b$ includes a rod 120 connected with the long arm of the lever $13^b$. The rod 120 may have a suitable pivotal or universal connection 121 with the outer end of the lever $13^b$. The lower end of the rod 120 extends down to the operating mechanism mounted on the deck of the master ship $10^b$. The operating mechanism includes a suitable base 122 mounted on the deck 123 of the master ship by pivotal connection 124. The base 122 carries a suitable power means 125 which we have illustrated in the form of an electric motor. The motor 125 drives a master gear 126 through a suitable speed reduction mechanism 127. The master gear 126 meshes with and drives two spaced pinions 128 carried by an upwardly projecting bracket portion 129 of the mounting 122. The rod 120 extends downwardly between the spaced pinions 128 and is provided at its opposite sides with rack teeth 130, meshing with the pinions. The rod 120 passes through suitable guides 131 above and below the driving pinions 138. The electric motor 125 may be reversible so that the rack rod 120 may be operated in opposite directions by means of the gear just described. It will be apparent how the lever $13^b$ may be operated by the mechanical operating means $14^b$ to move the chains $15^b$ upwardly through the action of the ratchet means 11. The embodiment of the invention illustrated in Figs. 3, 13 and 14 is particularly adapted for salvaging comparatively small vessels and may be provided in combinations of two or more lever units on each master ship, or may consist of two or more salvaging units, each consisting of a master ship with one or more lever units, etc.

Figure 15:
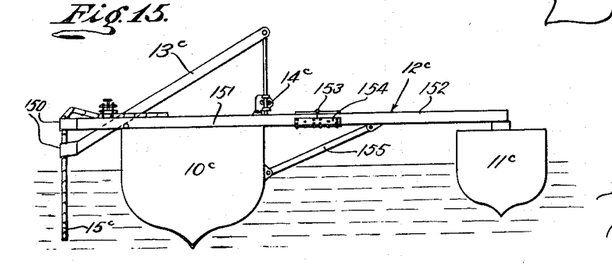
Fig. 15 is a diagrammatic view of still another form of the invention involving a foldable stabilizer.

The form of the invention illustrated in Fig. 15 of the drawings is similar, generally, to the form shown in Fig. 3, that is, it includes a lever $13^c$ pivotally mounted on a master ship $10^c$ through a stabilizer $12^c$. The stabilizer $12^c$ is provided to connect the master ship $10^c$ with a stabilizing vessel $11^c$. The lever $13^c$ operates a chain structure $15^c$ whose movement is controlled by a ratchet means 150 on the short arms of the stabilizer and the lever. The lever $13^c$ may be operated my a mechanical operating means $14^c$ similar generally to the mechanical operating means $14^b$ just described.

In this form of the invention, the stabilizer $12^c$ is foldable or collapsible so that it may be more readily stowed or positioned on the master ship $10^c$. In accordance with this embodiment of the invention, the stabilizer $12^c$ is sectional, being divided at a point substantially midway between its ends, and its sections 151 and 152 are connected together by a hinge or pivotal connection 153. When the apparatus is in use, a more positive connection 154 may be provided between the stabilizer sections 151 and 152. The hinge or pivot connection 153 permits the outer section 152 of the stabilizer to be swung on to the inner portion or section 151. When in the collapsed position, the stabilizer $12^c$ is comparatively short and occupies a minimum amount of space. As the stabilizer projects only a short distance from the opposite sides of the master ship $10^c$ it may not be necessary or desirable to swing the lever or stabilizer to the fore and aft position. When in the extended position, the stabilizer 12ᶜ may be braced in any suitable manner and its outer section 152 is connected with the master ship 10ᶜ by a brace structure 155. The salvaging apparatus illustrated in Fig. 15 of the drawings may be embodied in forms including any number of lever units and involving any number of master ship units. The operation of the apparatus is identical with the form illustrated in Fig. 3.

Having described only typical preferred forms of our invention, we do not wish to limit ourselves to the specific details set forth, but wish to reserve to ourselves any changes or variations that may appear to those skilled in the art or fall within the scope of the following claims.

Having described our invention, we claim:

1. Salvaging apparatus of the character described including, a master ship, a stabilizing ship, a lever pivoted on the master ship, a stabilizer carried by the master ship and detachably connected to the stabilizing ship, means mounting the lever and the stabilizer on the master ship so that they may be shifted as a unit between a position fore and aft of the master ship and a position abeam of the master ship in which last named position the stabilizer may be connected to the stabilizer ship, grapple means suspended from one arm of the lever, and lever operating means adapted to be connected with the other arm of the lever.

2. Salvaging apparatus of the character described including, a master ship, a stabilizing ship, a lever pivoted on the master ship, a stabilizer connecting the two ships, grapple means suspended from one arm of the lever, and lever operating means connected with the other arm of the lever including a jack ship.

3. Salvaging apparatus of the character described including a master ship, a stabilizing ship, a lever pivoted on the master ship, a stabilizer connecting the two ships, grapple means, an element carrying the grapple means and adapted to be operated by the lever, ratchet means for operating the lever, and a jack ship connected with the lever controlling the movement of said element.

4. Salvaging apparatus of the character described including a master ship, a stabilizing ship, a lever pivoted on the master ship, a stabilizer connecting the two ships, grapple means, an element carrying the grapple means and adapted to be operated by the lever, and ratchet means on the lever and stabilizer for controlling movement of said element.

5. Salvaging apparatus of the character described, including, a vessel, a lever pivoted on the vessel, grapple means, an element carrying the grapple means and adapted to be operated by the lever, a jack ship for operating the lever, and ratchet means controlling the direction of movement of said element.

6. Salvaging apparatus of the character described including, a master ship, a stabilizing ship, a stabilizer mounted on and disposed abeam of the master ship and having one end part connected with the stabilizing ship, a lever pivoted on the master ship through the stabilizer and arranged parallel to the stabilizer, hydraulic operating means connected with one arm of the lever, and grappling means carried by the other arm of the lever.

7. Salvaging apparatus of the character described including a master ship, a stabilizing ship, a stabilizer mounted on and disposed abeam of the master ship and having one end part connected with the stabilizing ship, a lever pivoted on the master ship through the stabilizer and arranged parallel to the stabilizer, means connected with one arm of the lever for operating the lever, an element operatively associated with the other arm of the lever, a grapple means on the element.

8. Salvaging apparatus including a master ship and a plurality of lever units on the master ship, each lever unit including a stabilizer mounted on the master ship, a stabilizing ship connected with the stabilizer, a lever pivoted on the master ship, operating means connected with one arm of the lever, and grapple means on the other arm of the lever.

9. Salvaging apparatus including a master ship and a plurality of lever units on the master ship, each lever unit including a stabilizer mounted on the master ship, a stabilizing ship connected with the stabilizer, a lever pivoted on the master ship, and grapple means carried by one arm of the lever, and a single operating means connected with the other arm of several units.

10. Salvaging apparatus including a master ship and a plurality of lever units on the master ship, each lever unit including a stabilizer mounted on the master ship, a stabilizing ship connected with the stabilizer, a lever pivoted on the master ship, and grapple means carried by one arm of the lever, and a single operating means connected with the other arm of several units, including a jack ship, and means for alternately passing water into and discharging water from the jack ship.

11. Salvaging apparatus of the character described, including a master ship, a stabilizing ship, a stabilizer connecting the two ships and having an arm projecting from the master ship, a pivoted lever carried by the master ship and having a long arm and a short arm movable vertically relative to the arm of the stabilizer, lever operating means connected with the long arm of the lever, grapple means, a flexible element carrying the grapple means and adapted to be operated by the short arm of the lever, and means controlling operation of the flexible element including a ratchet dog on the short arm of the lever for causing the element to move together with the short arm of the lever during its upward movement, and a ratchet dog on the stabilizer arm for holding the element against downward movement during the downward movement of the lever arm.

12. Salvaging apparatus of the character described including a master ship, a stabilizing ship, a stabilizer connecting the two ships, a lever pivotally mounted on the master ship through the stabilizer, grapple means suspended from one arm of the lever, and operating means on the master ship, and an operative connection between said operating means and the other arm of the lever.

13. Salvaging apparatus of the character described, including, a master ship, a stabilizing ship, a lever pivoted on the master ship, a stabilizer connecting the two ships, the stabilizer including two sections, and a hinge connection between the two sections whereby the sections may be folded together when not in use, grapple means, a flexible element suspending the grapple means and adapted to be operated by one arm of the lever, ratchet means on the stabilizer and said arm of the lever for controlling the movement of the flexible element, and lever operating means connected with the other arm of the lever.

14. Salvaging apparatus including, a master ship, a stabilizing ship, a stabilizer connecting the two ships, a lever pivotally mounted on the master ship, grappling means, a flexible element adapted to suspend the grappling means from one arm of the lever, means for operating the lever, ratchet means on the stabilizer and said arm of the lever for controlling the movement of said element, and means on the stabilizer for carrying said element as it is fed to and from the ratchet means.

15. Salvaging apparatus including, a master ship, a stabilizing ship, a stabilizer, means mounting the stabilizer on the master ship for limited rocking or tilting relative to the master ship, means connecting the stabilizer to the stabilizing ship, a lever pivotally mounted on the master ship through the stabilizer, a grappling means operated by the lever, and a jack ship operatively connected to the lever and adapted to rise and fall to operate the lever.

16. Salvaging apparatus including, a master ship, a stabilizing ship, a stabilizer connecting the two ships, a lever pivotally mounted on the master ship, grappling means, a chain carrying the grappling means and adapted to be operated by one arm of the lever, the chain being formed of separable links, means for operating the lever, ratchet means controlling the movement of the chain, and means on the stabilizer for carrying the chain as it is assembled and separated.

17. Salvaging apparatus including, a master ship, a stabilizing ship, a stabilizer carried by the master ship, a connection between the stabilizer and the stabilizing ship whereby the stabilizing ship may have limited motion relative to the stabilizer, a pivoted lever on the master ship, grapple means operable by the lever, and a jack ship connected with the lever and adapted to rise and fall in the water to operate the lever.

18. Salvaging apparatus of the character described including, a master ship, a lever pivotally mounted on the master ship, a salvaging means operable by the lever, a jack ship connected to the lever and adapted to rise and fall in the water to operate the lever, and a stabilizing ship connected to the master ship.

19. Salvaging apparatus of the character described including, a master ship, a stabilizing ship, a stabilizer connecting the two ships, a pivoted lever on the master ship, grapple means, a flexible element carrying the grapple means and adapted to be operated by the lever, means for operating the lever, and means for controlling the movement of the element including means on one arm of the lever for cooperating with the element to cause the element to move together with said arm during movement of the arm in one direction, and means on the stabilizer for holding the element against movement during movement of said arm in the other direction.

20. Salvaging apparatus of the character described including, a master ship, a lever mounted on the master ship to be pivoted on an axis extending fore and aft of the master ship and to have its arms project from the opposite sides of the master ship, grapple means suspended from one arm of the lever for engaging a sunken object, and means for operating the lever including, a jack ship connected with the other arm of the lever, and means for causing the jack ship to rise and fall in the water to operate the lever.

JAMES P. McARDLE.
THORKILD R. KNUDSEN.